United States Patent Office 3,230,260
Patented Jan. 18, 1966

3,230,260
PROCESS FOR THE ISOLATION OF N,O-DIMETHYLHYDROXYLAMINE
Jack A. Snyder, Claymont, Del., assignor to E. I. du Pont de Nemours and Company, Wilmington, Del., a corporation of Delaware
No Drawing. Filed May 26, 1961, Ser. No. 112,772
2 Claims. (Cl. 260—583)

This invention relates to the preparation of N,O-dimethylhydroxylamine. The invention is more particularly directed to processes for the isolation of N,O-dimethylhydroxylamine from a mixture of O-methylhydroxylamine and N,O-dimethylhydroxylamine by adding formaldehyde thereby to convert O-methylhydroxylamine to O-methylformaldoxime which escapes as a gas.

By the methylation of hydroxyurethane followed by hydrolysis and distillation, one can make a mixture of O-methylhydroxylamine and N,O-dimethylhydroxylamine. The methylation produces additional materials as does the hydrolysis but these are separated out, for the most part, in the distillation. Such a process is described in Major and Fleck J.A.C.S. 50 1479 (1928).

A material produced as just described or a mixture of O-methylhydroxylamine and N,O-dimethylhydroxylamine prepared in any fashion can be employed as a starting material in processes of the present invention. O-methylhydroxylamine and N,O-dimethylhydroxylamine are extremely difficult to separate by ordinary means because N,O - dimethylhydroxylamine boils at 42° C. and O-methylhydroxylamine boils at 48° C. The difference of only 6 degrees makes separation by distillation virtually impossible and it is made even more difficult by the desired product being the lower boiling of the two.

According to the present invention O-methylhydroxylamine and N,O-dimethylhydroxylamine are separated by the addition of formaldehyde, preferably in acid solution, to leave N,O-dimethylhydroxylamine substantially unchanged and to produce O-methylformaldoxime which, being volatile, escapes as a gas. This reaction and procedure can be illustrated as follows:

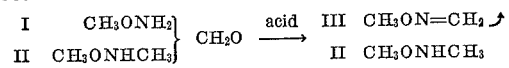

In the above:

I is O-methylhydroxylamine,
II is N,O-dimethylhydroxylamine, and
III is O-methylformaldoxime.

In addition to O-methylhydroxylamine and N,O-dimethylhydroxylamine a commercial mixture often contains other materials depending upon the process of production. Ordinarily such additional materials can be separated by conventional means either before or after treatment according to the present invention.

The relative proportions of O-methylhydroxylamine and N,O-dimethylhydroxylamine can vary over a wide range depending upon the completeness of the methylation in the process by which they are produced or, more broadly, depending upon the process by which they are produced. For purposes of the present invention it is immaterial how much of O-methylhydroxylamine is present with N,O-dimethylhydroxylamine because anywhere from near traces up to quite substantial amounts can be removed.

Processes of the invention are ordinarily conducted in aqueous solutions and it is more desired that the solution be at a pH below 7. The reason for having a low pH is that if N,O-dimethylhydroxylamine is present in the free state as an amine the escaping O-methylformaldoxime will tend to carry some of the N,O-dimethylhydroxylamine with it, thus leading to a loss in yield.

If N,O-dimethylhydroxylamine is combined with an acid this does not occur. Thus the relatively non-volatile acid salts of N,O-dimethylhydroxylamine can be formed such as the hydrochloride, the sulfate or hydrogen sulfate. Sulfamic acid or phosphoric acid can similarly be used though they are less preferred. An amount of acid can be used which is at least stoichiometrically equivalent to N,O-dimethylhydroxylamine and is preferred. Less than stoichiometric amounts can be used though as less and less acid is used there will be loss of yield. While the processes of the invention can be operated with a pH up to about 9, it is ordinarily preferred to use a pH around 1 or 2.

The amount of O-methylhydroxylamine and N,O-dimethylhydroxylamine dissolved in an aqueous solution will ordinarily be of the order of 1 molar though it can be higher or lower. The molarity of O-methylhydroxylamine and N,O-dimethylhydroxylamine combined can often run to 2 molar though there is no reason why it should not go up to 5 or 6 or even more.

According to the invention formaldehyde is used to effect a conversion of O-methylhydroxylamine to O-methylformaldoxime. The formaldehyde can be the ordinary formalin solutions of commerce which contain about 37% $CH_2O$ and small amount of methanol. Other forms of formaldehyde can equally well be used depending upon the process equipment and one can for example use gaseous $CH_2O$. Similarly, aqueous solutions of formaldehyde can be used which are produced by depolymerization of paraformaldehyde by using a little caustic. The techniques of supplying substantially monomeric formaldehyde for reaction are well understood.

The amount of formaldehyde to use is, of course, determined by the amount of O-methylhydroxylamine in a mixture to be treated. The formaldehyde reacts stoichiometrically with O-methylhydroxylamine and should be used in an amount to remove whatever proportion of O-methylhydroxylamine one wishes to take out of the mixture. Ordinarily it is desired to take out all in which case a slight excess of formaldehyde would ordinarily be employed. Even a large excess can be used because the formaldehyde is readily removed from the product with the O-methylformaldoxime by distillation.

The reaction of formaldehyde can be conducted at room temperatures but can also be operated at higher temperatures in which event the subsequent heating step which is preferred becomes a part of the formaldehyde addition step and not a separate operation.

After O-methylformaldoxime has been formed or is forming it is ordinarily desired to heat the aqueous solution to reflux temperatures, that is to say temperatures near 100° C. O-methylformaldoxime which because of its volatility is already leaving the solution is driven off more completely by the elevated temperature. Formaldehyde, too, is driven from the solution by the heating.

After O-methylformaldoxime and formaldehyde have been driven from the solution it is cooled and the pH is raised by the addition of a suitable alkali such as sodium hydroxide. The pH should be above 4 and it is preferred that it be above 6. Ordinarily the pH will be above 7. The exact pH is not at all critical.

The product, N,O-dimethylhydroxylamine, is then removed by distillation and it is to be observed that as the product is removed the pH tends to fall and it should be kept above 4 or preferably above 6 or 7 as above noted by further additions of alkali. Alternatively one can use larger amounts of alkali initially.

In order that the invention may be better understood reference should be had to the following illustrative examples:

*Example 1*

A mixture of O-methylhydroxylamine hydrochloride and N,O-dimethylhydroxylamine hydrochloride is prepared as described by Major and Fleck except that the crude amine hydrochloride mixture is not recrystallized after evaporation to remove alcohol and other volatiles. An aqueous solution of the mixed amine hydrochlorides is prepared which has the following composition:

| | Percent |
|---|---|
| O-methylhydroxylamine | 2.2 |
| N,O-dimethylhydroxylamine | 15.25 |
| Hydroxylamine and other unidentified basic impurities | 1.3 |

To 600 parts by weight of the above solution containing 91.6 parts by weight (1.50 moles) of N,O-dimethylhydroxylamine and 13.2 parts by weight (0.28 moles) of O-methylhydroxylamine at approximately pH 2.0 is added 25.8 parts by weight (a 10% excess) of 36% aqueous formaldehyde (9.3 parts by weight, 0.31 moles HCHO). The resulting solution is heated slowly to reflux while gases from the top of the condenser operating at 10° C. are led into a trap cooled by solid carbon dioxide and acetone. Gaseous O-methylformaldoxime is evolved from about 30° C. up to the reflux temperature. About 17 parts by weight of solid is collected in the trap (theoretical: $CH_3ON=CH_2$ 16.5 parts by weight). The solid melted at about −65° C. and boiled at about −12° C. The corresponding constants for O-methylformaldoxime are B.P. −11° C., F.P. −61° C.

The aqueous solution is made alkaline with 50% aqueous NaOH and the amines are obtained by rectification in a 6 ft. x 1 in. helix-packed column. The first fraction boiling from 40° C.–43° C. is substantially pure N,O-dimethylhydroxylamine (1.30 mole) with traces of N,N,O-trimethylhydroxylamines and about 0.02 mole O-methylhydroxylamine. The second fraction boiling from 43° C. to 65° C. contained 0.20 mole N,O-dimethylhydroxylamine and <0.01 of O-methylhydroxylamine.

| | Before | After |
|---|---|---|
| O-methylhydroxylamine | 0.28 | <0.03 |
| N,O-dimethylhydroxylamine | 1.50 | 1.50 |

Thus, approximately 90% of the methoxyamine is removed by treatment with 10% excess formaldehyde with little or no loss of secondary amine N,O-dimethylhydroxylamine.

*Example 2*

The starting material is a pH 0.5 solution of a mixture of methylated hydroxylamine sulfate salts of the following composition in a saturated aqueous sodium acid sulfate solution as determined by gas chromatography:

| | Percent |
|---|---|
| O-methylhydroxylamine | 0.155 |
| N,O-dimethylhydroxylamine | 1.62 |
| N,N,O-trimethylhydroxylamine | .064 |

To 1759 parts by weight of the above solution containing

| | Parts by weight |
|---|---|
| O-methylhydroxylamine | 2.72 (0.058 mole). |
| N,O-dimethylhydroxylamine | 28.4 (0.465 mole). |
| N,N,O-trimethylhydroxylamine | 1.1 (0.015 mole). | is added 13.0 ml. of 37% aqueous formaldehyde solution (5.2 parts of weight of HCHO, 0.174 mole; 3 times molar quantity of O-methylhydroxylamine). The solution is heated to the reflux temperature and gaseous O-methylformaldoxime and excess formaldehyde are distilled over with about 200 ml. of water. The acidic solution is made alkaline with 80 parts by weight of 50% aqueous NaOH, and the freed amines are distilled. Two 100 ml. aqueous amine fractions are taken. The first fraction proved to contain all the amines. Analysis by gas chromatography indicates the following recoveries of amines:

| | Parts by weight |
|---|---|
| O-methylhydroxylamine | Absent. |
| N,O-dimethylhydroxylamine | 26.3 (0.43 mole). |
| N,N,O-trimethylhydroxylamine | 1.2 (0.016 mole). |

Thus, the O-methylhydroxylamine has been completely eliminated from the solution while the desired N,O-dimethylhydroxylamine is recovered substantially undiminished. Instead of using sulfuric acid as in the above example there can be used molecularly equivalent amounts of hydrochloric acid (Example 1), or phosphoric acid or any other non-reactive acid of sufficient strength to fix the amine in substantially non-volatile condition during removal of excess formaldehyde.

I claim:

1. A process for isolating N,O-dimethylhydroxylamine from a mixture of O-methylhydroxylamine and N,O-dimethylhydroxylamine by adding formaldehyde to an aqueous solution of O-methylhydroxylamine and N,O-dimethylhydroxylamine at a pH below 7, there being present an amount at least stoichiometrically equivalent to the N,O-dimethylhydroxylamine of an acid selected from the group consisting of hydrochloric, sulfuric, sulfurous, sulfamic, and phosphoric, the temperature being from room temperature to about 100° C., the amount of formaldehyde at least stoichiometrically equivalent to the amount of O-methylhydroxylamine whereby O-methylhydroxylamine is then separated along with unreacted formaldehyde from the mixture by heating up to about 100° C., then raising the pH above 7 with sodium hydroxide and distilling off N,O-dimethylhydroxylamine.

2. A process for isolating N,O-dimethylhydroxylamine from a mixture of O-methylhydroxylamine and N,O-dimethylhydroxylamine by adding formaldehyde to an aqueous solution of O-methylhydroxylamine and N,O-dimethylhydroxylamine at a pH about 1 to 2 there being present an amount at least stoichiometrically equivalent to the N,O-dimethylhydroxylamine of an acid selected from the group consisting of hydrochloric, sulfuric, sulfurous, sulfamic, and phosphoric, the mixture being initially at about room temperature and the amount of formaldehyde being at least stoichmetrically equivalent to the amount of O - methylhydroxylamine whereby O - methylhydroxylamine is converted to O-methylformaldoxime which is separated along with unreacted formaldehyde from the mixture by heating at about 100° C., and then distilling off N,O-dimethylhydroxyalmine while maintaining a pH above 6 using sodium hydroxide.

References Cited by the Examiner

J. F. Walker: "Formaldehyde," page 167 (1953).
Major et al.: "J. Am. Chem. Soc.," vol. 50, pages 1479–1480.
T. C. Bissot et al.: "J. Am. Chem. Soc.," vol. 79, pages 796–800 (1957).

CHARLES B. PARKER, *Primary Examiner.*
LEON ZITVER, *Examiner.*